(12) United States Patent
Kim et al.

(10) Patent No.: US 10,585,231 B2
(45) Date of Patent: Mar. 10, 2020

(54) DIRECTIONAL BACKLIGHT UNIT AND IMAGE DISPLAY APPARATUS INCLUDING THE SAME

(71) Applicant: SAMSUNG ELECTRONICS CO., LTD., Suwon-si (KR)

(72) Inventors: Hyunjoon Kim, Seoul (KR); Bongsu Shin, Seoul (KR); Dongouk Kim, Pyeongtaek-si (KR); Joonyong Park, Suwon-si (KR); Jihyun Bae, Seoul (KR); Dongsik Shim, Hwaseong-si (KR); Sunghoon Lee, Seoul (KR); Jaeseung Chung, Suwon-si (KR); Seokho Song, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 121 days.

(21) Appl. No.: 15/656,349

(22) Filed: Jul. 21, 2017

(65) Prior Publication Data
US 2018/0128962 A1    May 10, 2018

(30) Foreign Application Priority Data
Nov. 8, 2016    (KR) .................. 10-2016-0148181

(51) Int. Cl.
*F21V 8/00* (2006.01)

(52) U.S. Cl.
CPC .......... *G02B 6/0061* (2013.01); *G02B 6/005* (2013.01); *G02B 6/0035* (2013.01); *G02B 6/0036* (2013.01); *G02B 6/0068* (2013.01)

(58) Field of Classification Search
CPC .... G02B 6/0035; G02B 6/0036; G02B 6/005; G02B 6/0061; G02B 6/0068; G02B 27/2214; G02B 27/2228; G02B 27/425
See application file for complete search history.

(56) References Cited

U.S. PATENT DOCUMENTS

| 5,301,062 A | 4/1994 | Takahashi et al. |
| 6,943,788 B2 | 9/2005 | Tomono |
| 7,085,056 B2 * | 8/2006 | Chen .................. G02B 6/0038 349/65 |

(Continued)

FOREIGN PATENT DOCUMENTS

| JP | 2013-205512 A | 10/2013 |
| KR | 2003-0030365 A | 4/2003 |

(Continued)

OTHER PUBLICATIONS

Communication dated Mar. 27, 2018 issued by the European Patent Office in counterpart European Patent Application No. 17196445.5.

(Continued)

*Primary Examiner* — Peggy A Neils
(74) *Attorney, Agent, or Firm* — Sughrue Mion, PLLC

(57) ABSTRACT

A directional backlight unit and an image display apparatus including the directional backlight unit are provided. The directional backlight unit includes at least one light source and a light guide plate that guides light emitted by the light source. An interval between grating patterns formed on the light guide plate satisfies at least one condition of a first range and a second range in order to minimize a spreading of light caused by the grating patterns.

22 Claims, 17 Drawing Sheets

(56) References Cited

U.S. PATENT DOCUMENTS

| | | | |
|---|---|---|---|
| 9,128,226 B2 * | 9/2015 | Fattal | G02B 6/0036 |
| 9,436,015 B2 | 9/2016 | Woodgate et al. | |
| 9,557,466 B2 * | 1/2017 | Fattal | G02B 6/0068 |
| 9,804,404 B2 * | 10/2017 | Lin | G02B 27/2214 |
| 9,971,083 B2 * | 5/2018 | Jung | G02B 6/0026 |
| 10,114,225 B2 | 10/2018 | Kim et al. | |
| 2003/0007732 A1 | 1/2003 | Ronnekleiv | |
| 2005/0052732 A1 | 3/2005 | Chen et al. | |
| 2009/0129116 A1 * | 5/2009 | Kim | G02B 6/0035 362/606 |
| 2009/0322986 A1 * | 12/2009 | Wei | G02B 6/0043 349/64 |
| 2011/0141395 A1 * | 6/2011 | Yashiro | G02B 6/0036 349/62 |
| 2014/0043856 A1 | 2/2014 | Thompson et al. | |
| 2014/0044392 A1 | 2/2014 | Fattal et al. | |
| 2014/0093692 A1 | 4/2014 | Miyazawa et al. | |
| 2014/0293759 A1 | 10/2014 | Taff et al. | |
| 2014/0300840 A1 | 10/2014 | Fattal et al. | |
| 2014/0300947 A1 | 10/2014 | Fattal et al. | |
| 2014/0300960 A1 | 10/2014 | Santori et al. | |
| 2014/0376207 A1 | 12/2014 | Futterer | |
| 2015/0036068 A1 | 2/2015 | Fattal et al. | |
| 2015/0138486 A1 | 5/2015 | Lee | |
| 2015/0192725 A1 * | 7/2015 | Facke | G02B 6/0035 362/606 |
| 2016/0033706 A1 | 2/2016 | Fattal et al. | |
| 2017/0176669 A1 | 6/2017 | Chung et al. | |
| 2018/0188440 A1 * | 7/2018 | Fattal | G02B 6/0023 |

FOREIGN PATENT DOCUMENTS

| | | |
|---|---|---|
| KR | 10-2007-0018049 A | 2/2007 |
| KR | 10-2014-0004102 A | 1/2014 |
| KR | 10-2015-0021017 A | 2/2015 |
| KR | 10-2015-0057743 A | 5/2015 |
| KR | 10-2017-0073218 A | 6/2017 |
| KR | 10-2017-0088690 A | 8/2017 |

OTHER PUBLICATIONS

Fattal, et al., "A multi-directional backlight for a wide-angle, glasses-free three-dimensional display", Nature, vol. 495, Mar. 21, 2013, pp. 348-351.

Kimmel, et al., "Mobile display backlight light guide plates based on slanted grating arrays", Journal of Photonics for Energy, vol. 2, 2012, 12 pages total.

* cited by examiner

DIRECTIONAL BACKLIGHT UNIT AND IMAGE DISPLAY APPARATUS INCLUDING THE SAME

CROSS-REFERENCE TO RELATED APPLICATION

This application claims priority from Korean Patent Application No. 10-2016-0148181, filed on Nov. 8, 2016 in the Korean Intellectual Property Office, the disclosure of which is incorporated herein by reference in its entirety.

BACKGROUND

1. Field

Various exemplary embodiments relate to a directional backlight unit having an improved light spreading capability, an image display apparatus including the directional backlight unit, and a method for manufacturing the directional backlight unit.

2. Description of the Related Art

To overcome the limitation of displaying only two-dimensional (2D) images without depth information in traditional image display apparatuses, techniques related to three-dimensional (3D) image display apparatuses have been studied intensively. A main type of currently commercialized 3D image display apparatuses uses bionocular parallax, in which a left-eye image and a right-eye image having different viewpoints are provided to a left eye and a right eye of a viewer, thereby enabling the viewer to feel a cubic effect. The 3D image display apparatuses may be classified into glasses-type 3D image display apparatuses requiring special glasses and non-glasses-type 3D image display apparatuses that do not require glasses.

The glasses-type 3D image display apparatuses use a red-green glasses type for movie theaters and use a polarized-glass type or a liquid crystal shutter type for televisions (TVs). The non-glasses-type 3D image display apparatuses are classified into a barrier type and a lenticular type based on their structures, and are classified into a multiview rendering type, a volumetric type that contains all information of a 3D space and expresses the information on the 3D space in the form of voxels, an integral imaging type that captures images from various angles, which are focused through compound eye (i.e., fly's eye) lenses of insects, and displays the images inversely, a holographic type, and so forth, based on their image implementation types.

The non-glasses-type 3D image display apparatus using a directional backlight unit uses a grating having a size of several hundreds of nanometers in terms of a structure, and sets the direction of light emission to a desired direction by selecting one of the aforementioned image implementation types, thus implementing a 3D image.

SUMMARY

One or more exemplary embodiments provide a directional backlight unit having an improved light spreading capability.

One or more exemplary embodiments also provide an image display apparatus including a directional backlight unit having an improved light spreading capability.

Additional aspects will be set forth in part in the description which follows and, in part, will be apparent from the description, or may be learned by practice of the presented exemplary embodiments.

According to an aspect of an exemplary embodiment, there is provided at least one light source configured to emit light; and a light guide plate configured to guide the light emitted by the at least one light source, wherein a plurality of grating patterns are provided on an exit surface of the light guide plate, each grating pattern from among the plurality of grating patterns being configured to cause the light to travel in a respective predetermined direction, and wherein an interval between adjacent grating patterns from among the plurality of grating patterns satisfies at least one condition from among a first range less than $1/10$ of a wavelength of the light emitted by the light source and a second range greater than $180/\pi$ times the wavelength of the light emitted by the light source.

The wavelength of the light emitted by the light source may be within a range of between 380 nm and 780 nm.

The interval between the adjacent grating patterns may satisfy at least one condition from among a third range less than 50 nm and a fourth range greater than 30 μm.

The plurality of grating patterns may include a plurality of panel-oriented grating patterns that form directivities toward a plurality of viewing zones, and a plurality of dummy grating patterns respectively disposed between adjacent panel-oriented grating patterns from among the plurality of panel-oriented grating patterns.

The directional backlight unit may further include a dummy light blocking layer comprising a plurality of light blocking regions that are configured to block light that propagates from each of the plurality of dummy grating patterns.

An average refractive index of each dummy grating pattern from among the plurality of dummy grating patterns may be substantially identical to an average refractive index of at least one panel-oriented grating pattern from among the plurality of panel-oriented grating patterns that is adjacent to each dummy grating pattern from among the plurality of dummy grating patterns.

At least one from among a pitch of a grating and a direction of a grating of each dummy grating pattern from among the plurality of dummy grating patterns may be different from at least one from among a pitch of a grating and a direction of at least one panel-oriented grating pattern from among the plurality of panel-oriented grating patterns that is adjacent to each dummy grating pattern from among the plurality of dummy grating patterns.

A light emission efficiency of each dummy grating pattern from among the plurality of dummy grating patterns may be lower than a light emission efficiency of each panel-oriented grating pattern from among the plurality of panel-oriented grating patterns.

The at least one light source may include a plurality of light sources configured to emit light of different wavelengths, wherein at least two grating patterns from among the plurality of grating patterns selectively refract the light of the different wavelengths.

According to an aspect of another exemplary embodiment, there is provided an image display apparatus including: at least one light source configured to emit light; a light guide plate configured to guide the light emitted by the at least one light source; and a display panel configured to form an image by using the light guided by the light guide plate, wherein a plurality of grating patterns are formed on an exit surface of the light guide plate, each grating pattern from among the plurality of grating patterns being configured to cause the light to travel in a respective predetermined direction, and wherein an interval between adjacent grating patterns from among the plurality of grating patterns satisfies at least one condition from among a first range less than ¹⁄₁₀ of a wavelength of the light emitted by the light source and a second range greater than 180/π times the wavelength of the light emitted by the light source.

The wavelength of the light emitted by the light source may be within a range of between 380 nm and 780 nm.

The interval between the adjacent grating patterns may satisfy at least one condition from among the first range and a third range greater than 30 µm.

The plurality of grating patterns may include a plurality of panel-oriented grating patterns that form orientations toward a plurality of viewing zones and a plurality of dummy grating patterns respectively disposed between adjacent panel-oriented grating patterns from among the plurality of panel-oriented grating patterns.

The plurality of dummy grating patterns may be configured to prevent light that propagates from each dummy grating pattern from among the plurality of dummy grating patterns from being used to form the image.

The plurality of dummy grating patterns may be configured to direct light that propagates from each dummy grating pattern from among the plurality of dummy grating patterns outside a viewing angle of the display panel.

The image display apparatus may further include a dummy light blocking layer comprising a plurality of light blocking regions configured to prevent light that propagates from each dummy grating pattern from among the plurality of dummy grating patterns from being incident upon the display panel.

The plurality of dummy grating patterns may be configured such that a respective wavelength band selected in each dummy grating pattern from among the plurality of dummy grating patterns is different from a respective wavelength band of a pixel oriented by each dummy grating pattern from among the plurality of dummy grating patterns.

A respective average refractive index of each dummy grating pattern from among the plurality of dummy grating patterns may be substantially identical to an average refractive index of at least one panel-oriented grating pattern from among the plurality of panel-oriented grating patterns that is adjacent to each dummy grating pattern from among the plurality of dummy grating patterns.

At least one from among a pitch of a grating and a direction of a grating of each dummy grating pattern from among the plurality of dummy grating patterns may be different from at least one from among a pitch of grating and a direction of a grating of at least one panel oriented grating patter from among the plurality of panel-oriented grating patterns that is adjacent to each dummy grating pattern from among the plurality of dummy grating patterns.

A light emission efficiency of each dummy grating pattern from among the plurality of dummy grating patterns may be lower than a light emission efficiency of each panel-oriented grating pattern from among the plurality of panel-oriented grating patterns.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

Although terms used in the present disclosure are selected with general terms popularly used at present under the consideration of functions in the present disclosure, the terms may vary according to the intention of those of ordinary skill in the art, judicial precedents, or introduction of new technology. In addition, in a specific case, the applicant voluntarily may select terms, and in this case, the meaning of the terms is disclosed in a corresponding description part of the present disclosure. Thus, the terms used in the present disclosure should be defined not by the simple names of the terms but by the meaning of the terms and the contents throughout the present disclosure.

In a description of the exemplary embodiments, when a part is connected to another part, the part may be not only directly connected to another part but also electrically connected to another part with another device intervening in between them. If it is assumed that a certain part includes a certain component, the term 'including' means that a corresponding component may further include other components unless a specific meaning opposed to the corresponding component is written. The term used in the exemplary embodiments such as "unit" or "module" indicates a unit for processing at least one function or operation, and may be implemented in hardware, software, or in a combination of hardware and software.

The term such as "comprise" or "include" used in the present disclosure should not be interpreted as including all of elements or operations described herein, and should be interpreted as excluding some of the elements or operations or as further including additional elements or operations.

Although the terms such as "first" and "second" used in the current exemplary embodiments of the present disclosure may modify various elements of the various exemplary embodiments, but these terms do not limit the corresponding elements. These terms may be used for the purpose of distinguishing one element from another element.

The following description of the exemplary embodiments should not be construed as limiting the scope of the exemplary embodiments, and what may be easily deduced by those of ordinary skill in the art should be construed as falling within the scope of the exemplary embodiments. Hereinafter, the exemplary embodiments for illustration will be described in detail with reference to the accompanying drawings.

Figure 1:
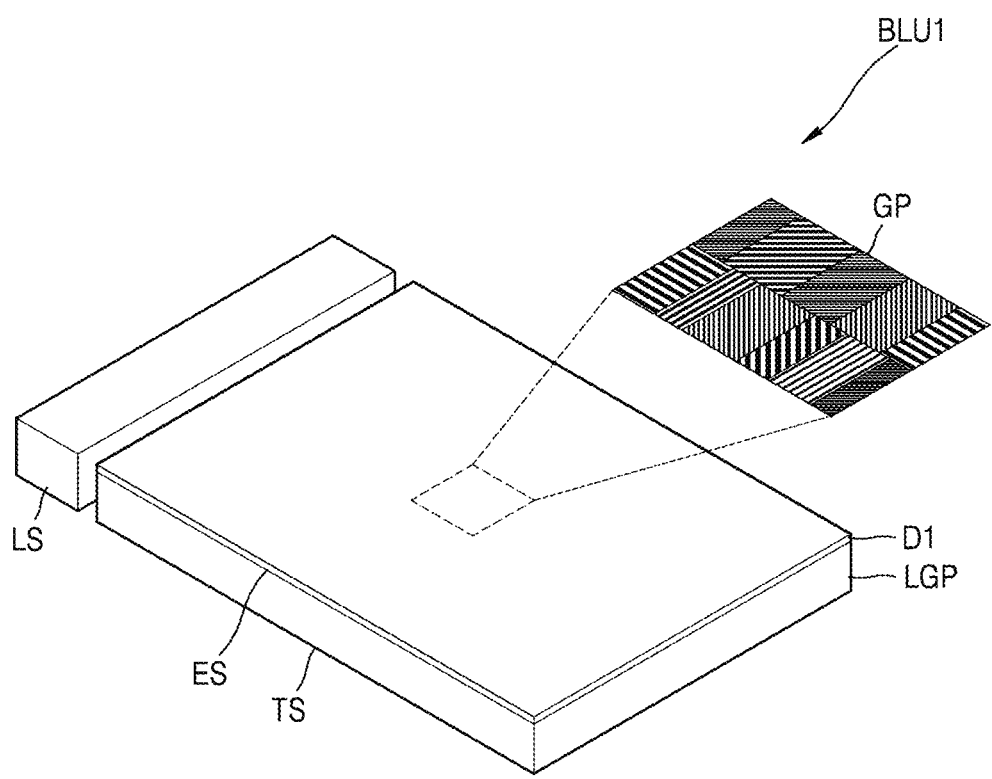
FIG. 1 is a perspective view illustrating a structure of a directional backlight unit, according to an exemplary embodiment.

FIG. 1 is a perspective view illustrating a structure of a directional backlight unit, according to an exemplary embodiment.

Referring to FIG. 1, a directional backlight unit BLU (also referred to herein as a "directional backlight device") according to an exemplary embodiment may include at least one light source LS and a light guide plate LGP that guides and emits light emitted by the light source LS. On an exit surface ES of the light guide plate LGP, a diffractive element D1 which includes a plurality of grating patterns GP is formed. The pluraltiy of grating patterns GP may be arranged repetitively, i.e., in a repeating pattern.

The light guide pattern LGP may include at least one incident surface upon which light emitted by the light source LS is incident and the exit surface ES from which the light traveling in the light guide plate LGP is emitted. The light guide plate LGP guides the light from the light source LS through total internal reflection so as to be emitted through the exit surface ES. A surface that faces the exit surface ES is a total reflection surface TS, and light, reflected after failing to pass through the diffractive element D1 on the exit surface ES, is totally reflected from the total reflection surface TS and travels inside the light guide plate LGP. The light source LS may be provided in an edge of the light guide plate LGP, and light emitted from the light source LS may meet the exit surface ES of the light guide plate LGP a plurality of times inside the light guide plate LGP through total reflection.

Although the light guide plate LGP is illustrated as having the shape of a flat plate in FIG. 1, an exemplary embodiment is not limited to this illustration. For example, the exit surface ES of the light guide plate LGP may have the shape of a curved surface.

A diffractive element D1 formed on the exit surface ES of the light guide plate LGP may include the plurality of grating patterns GP so that light traveling inside the light guide plate LGP through total internal reflection may be emitted in a designated direction. In the grating pattern GP, a grating G that protrudes from or is recessed with respect to the exit surface ES is repeatedly arranged (i.e., arranged in a repeating pattern) according to a specific rule. The grating G may include the same material as that of the light guide plate LGP. However, the material of the grating G is not limited to this example. At least two of the plurality of grating patterns GP may have different pattern shapes. For example, at least any one of a direction, an interval, and a duty ratio of a grating may vary. The traveling direction of light emitted from the grating pattern GP may vary based on a pattern shape of the grating pattern GP. The plurality of grating patterns GP may emit light toward a plurality of different respective viewing zones.

The plurality of grating patterns GP may be arranged adjacent to each other. In this aspect, there may not exist any region where no pattern is formed between the grating patterns GP. By arranging the grating patterns GP so as to be adjacent to each other, there may not exist any region where no grating pattern GP is formed on the exit surface ES of the light guide plate LGP. Since there is no region where the grating pattern GP is not formed on the exit surface ES of the light guide plate LGP, the heterogeneity of the exit surface ES of the light guide plate LGP may be minimized. The minimization of the heterogeneity may be implemented by, for example, making an average refractive index of the grating patterns GP formed on the exit surface ES of the light guide plate LGP almost uniform over the entire area of the exit surface ES of the light guide plate LGP. Herein, the 'average refractive index' is a concept that relates to both a refractive index of a grating material (e.g., a light guide plate material) of a grating pattern and a refractive index of a material (e.g., the air) between gratings. As the uniformity of the average refractive index on the exit surface ES decreases, that is, the distribution range of of the average refractive index is relatively broad, the spreading of light due to the grating pattern GP increases. In an exemplary embodiment, the average refractive index of the grating patterns GP is almost uniform over the entire area of the exit surface ES, thereby minimizing the spreading of light due to the grating pattern GP.

Figure 2:
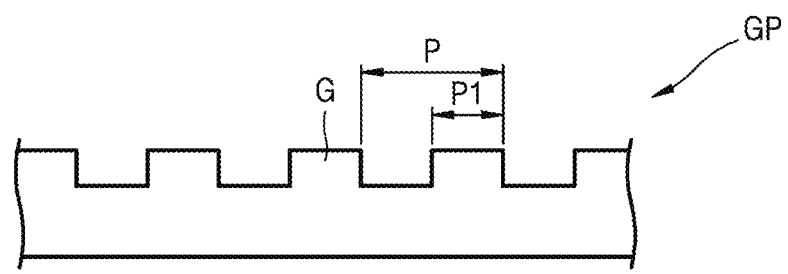
FIG. 2 is a cross-sectional view illustrating in detail a cross-section of a grating pattern illustrated in FIG. 1 to describe an average refractive index.

FIG. 2 is a cross-sectional view illustrating in detail a cross-section of the grating pattern GP illustrated in FIG. 1 to describe an average refractive index.

Referring to FIG. 2, characteristics of the shape of the grating pattern GP may be indicated by a pitch P that indicates a repetition interval of the gratings G and a width P1 of the grating G. A duty ratio of the grating pattern GP may be indicated by a ratio of the width P1 of the grating G with respect to the pitch P between adjacent pairs of the gratings G.

The average refractive index of the grating pattern GP may vary based on the duty ratio of the grating pattern GP. For example, assuming that the duty ratio of the grating pattern GP is 'a' and the gratings G is in the air (refractive index~1), an average refractive index neff of the grating pattern GP may be expressed as follows in Equation 1 below:

$$\text{neff} = a*n1 + (1-a)*1 \qquad (1),$$

where n1 indicates a refractive index of a material of the grating pattern GP, i.e., a material of the gratings G.

n1 may be a refractive index of the light guide plate LGP. Since a is a value between 0 and 1 and n1 is greater than 1, neff is less than n1.

Unlike in an exemplary embodiment, if between the grating patterns GP, there is a region where the grating G is not formed, the refractive index of the area is equal to n1, which is greater than neff defined above. As such, the average refractive index of the exit surface ES of the light guide plate LGP includes neff and n1 and has a distribution that includes a high refractive index and a low refractive index, and thus the heterogeneity increases.

Figure 3:
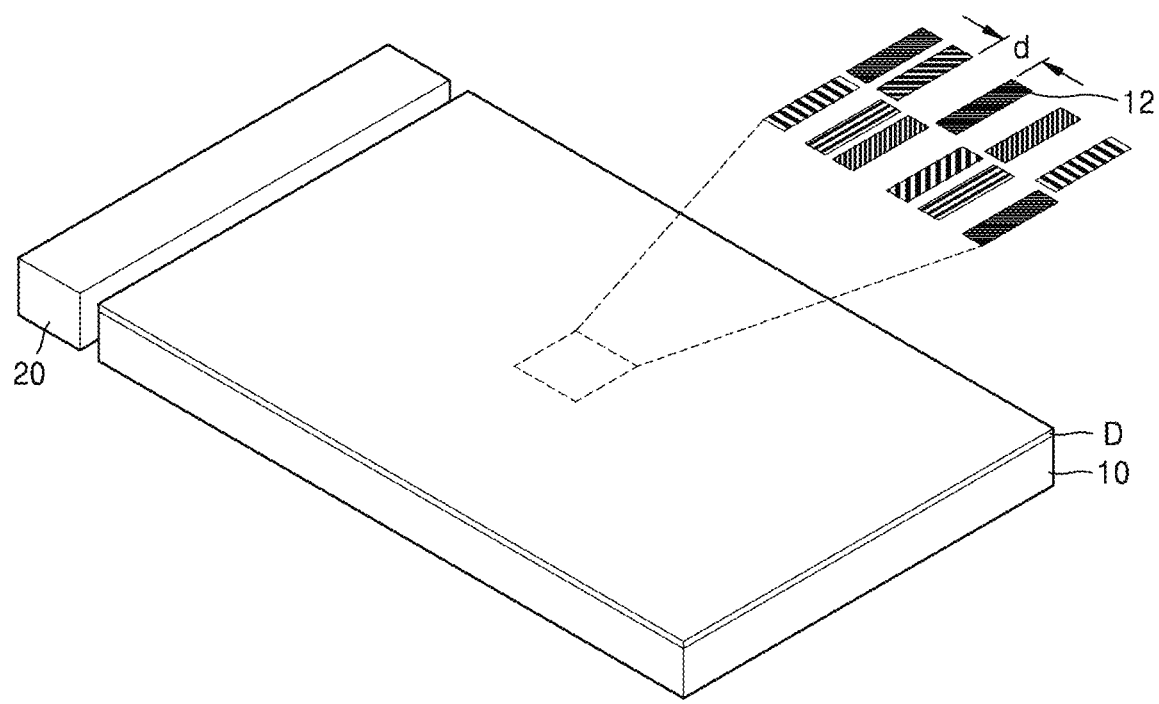
FIG. 3 is a perspective view illustrating a structure of a directional backlight unit, according to a comparison example.

FIG. 3 is a perspective view illustrating a structure of the directional backlight unit BLU according to a comparison example.

Referring to FIG. 3, the directional backlight unit BLU according to the comparison example includes a light source 20, a light guide plate 10 that guides and emits light emitted by the light source 20, and a diffractive element D that is formed on a top surface of the light guide plate 10 and includes a plurality of grating patterns 12.

Unlike in an exemplary embodiment, in the comparison example, the grating patterns 12 are formed spaced apart from each other, so as to have a predetermined interval d. Thus, an average refractive index on the top surface of the light guide plate 10 differs between a region where the grating pattern 12 is formed and a region where the grating pattern 12 is not formed.

Figure 4:
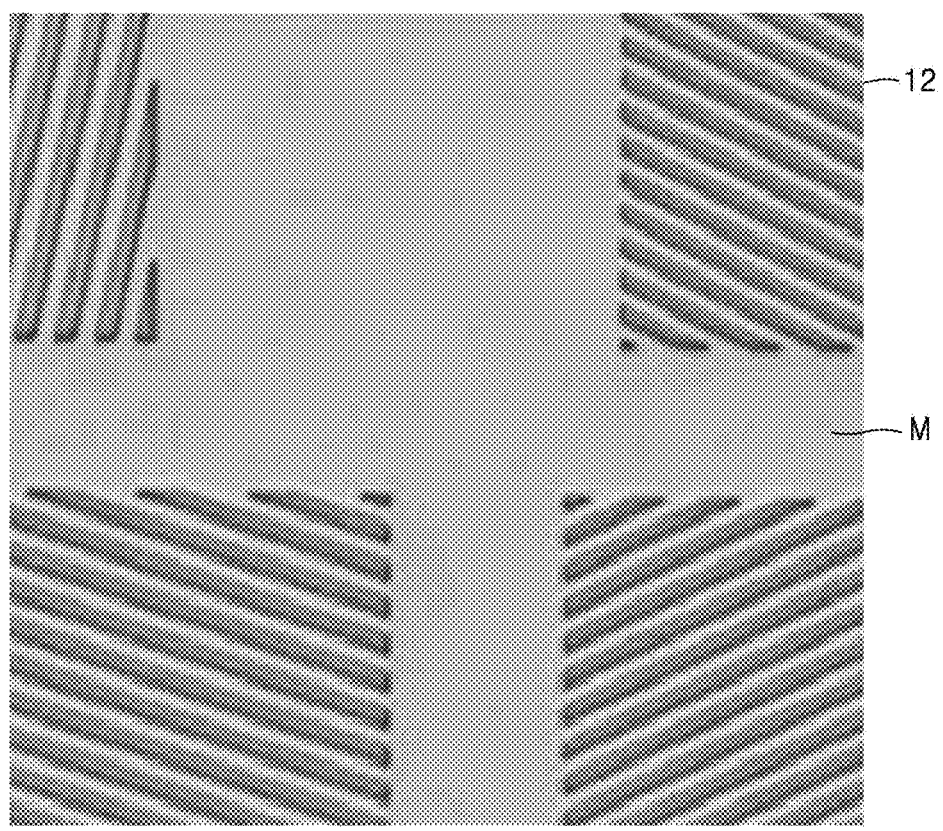
FIG. 4 is a microscope picture showing in detail a grating pattern formed on a light guide plate illustrated in FIG. 3.

FIG. 4 is a microscope picture showing in detail the grating patterns 12 formed on the light guide plate 10 illustrated in FIG. 3.

Referring to FIG. 4, on a surface of the light guide plate 10, there may be a region where the grating pattern 12 is formed and a region M where the grating pattern 12 does not exist. The region M where the grating pattern 12 does not exist may have a higher average refractive index than the region where the grating pattern 12 is formed, because the surface of the light guide plate 10 is entirely filled with the material of the light guide plate 10.

As described above, the average refractive index of the region where the grating pattern 12 is formed may vary based on the duty ratio of the grating pattern 12. As the duty ratio of the grating pattern 12 decreases, a rate of the material of the light guide plate 10 with respect to the region where the grating pattern 12 is formed decreases, such that the average refractive index of the region where the grating pattern 12 may further decrease. Due to a difference between the average refractive index of the region M where the grating pattern 12 does not exist and the average refractive index of the region where the grating pattern 12 exists, a phenomenon similar to scattering of light that is incident upon a heterogeneous surface may occur on an exit surface of the light guide plate 10. Light is partially emitted in the region where the grating pattern 12 exists, whereas the light is totally reflected into the light guide plate 10 in the region M where the grating pattern 12 does not exist, such that if a width of the region M where the grating pattern 12 does not exist is less than a wavelength of the light or has the same digits as the wavelength of the light, then the totally reflected light may spread in a similar manner to diffraction of light that propagates through a slit.

Due to such spreading of the light, a cross-sectional area of the light may increase. This light spreading phenomenon may occur prominently when the interval d between the grating patterns 12 is approximately equal to several micrometers (μm).

Figure 5:
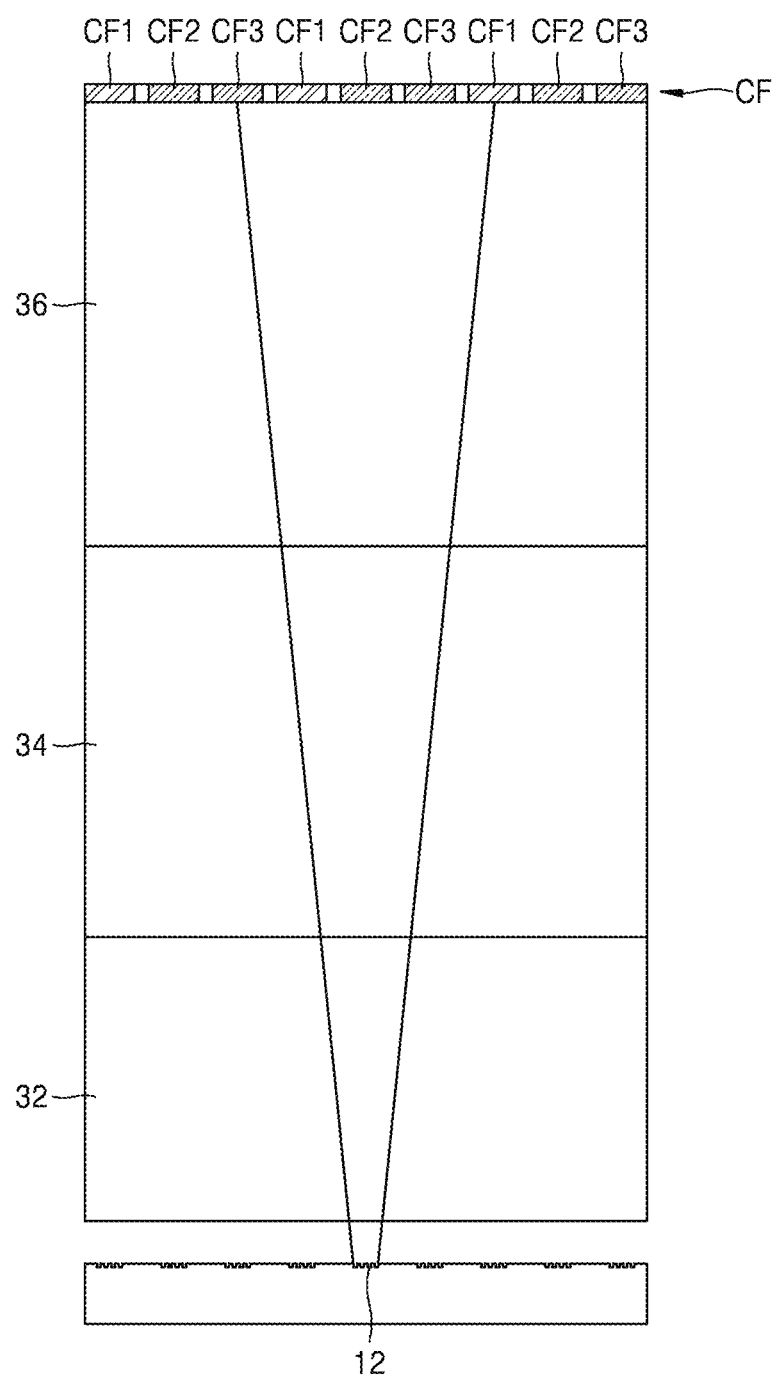
FIG. 5 is a conceptual view illustrating a spreading of light emitted from a grating pattern illustrated in FIG. 3.

FIG. 5 is a conceptual view illustrating a spreading of light emitted from the grating pattern 12 illustrated in FIG. 3.

Referring to FIG. 5, light emitted from the grating pattern 12 is incident to a color filter layer CF of a display panel after propagating through a plurality of intermediate layers 32, 34, and 36. The plurality of intermediate layers 32, 34, and 36 may include various layers of the display panel, for example, glass, an optical film, and so forth. The light emitted from the grating pattern 12 is incident to any one of color filters CF1, CF2, and CF3 of the color filter layer CF. At least two of the plurality of filters CF1, CF2, and CF3 may facilitate a propagation of light of different wavelengths therethrough.

Each of the plurality of grating patterns 12 changes a traveling direction of light so as to cause the light to be incident to any one of the plurality of color filters CF1, CF2, and CF3. A cross-sectional area of the light emitted from the grating pattern 12 of the light guide plate 10 may increase due to the spreading of the light. As the cross-sectional area of the light emitted from the grating pattern 12 increases, the light emitted from the grating pattern 12 is incident to another color filter as well as to a color filter that corresponds to the grating pattern 12, thereby increasing crosstalk. The crosstalk may be a cause for degradation of the image quality of the display panel.

Figure 6:
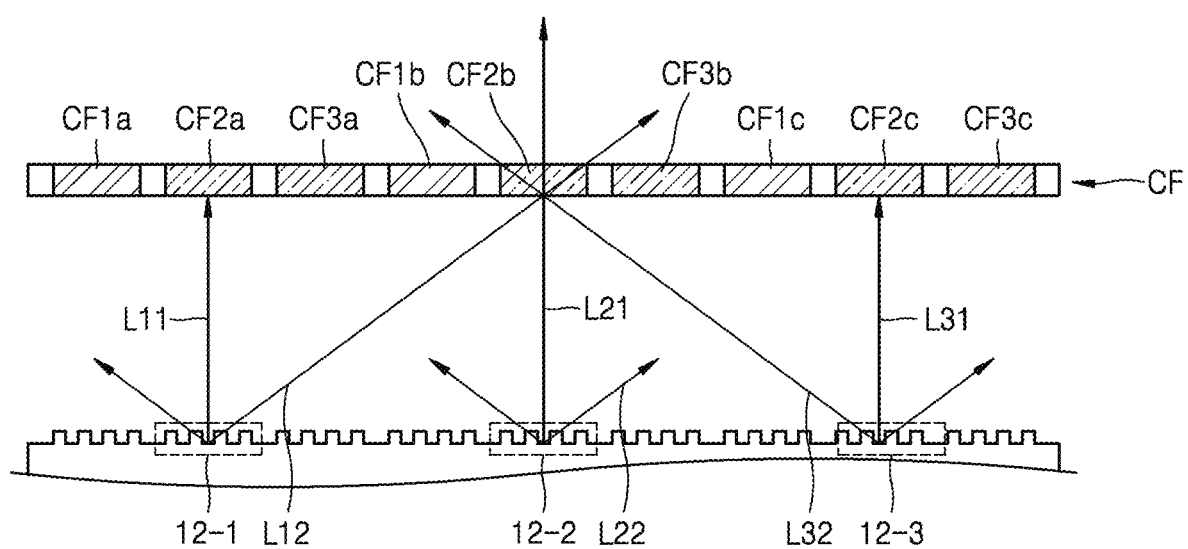
FIG. 6 is a conceptual view illustrating an occurrence of crosstalk due to the spreading of light.

FIG. 6 is a conceptual view illustrating an occurrence of crosstalk due to the spreading of light.

In FIG. 6, CF1a, CF1b, and CF1c are color filters that facilitate a propagation of red light therethrough, CF2a, CF2b, and CF2c are color filters that facilitate a propagation of green light therethrough, and CF3a, CF3b, and CF3c are color filters that facilitate a propagation of blue light therethrough. Light that passes through each of a plurality of color filters may be incident to any one of pixels of a display panel of an image display apparatus.

Each of grating patterns provided on a surface of the light guide plate 10 emits light of a corresponding wavelength to a color filter provided in a specific position. For example, a first grating pattern 12-1 may emits green light to the color filter CF2a, a second grating pattern 12-2 may emit green light to the color filter CF2b, and a third grating pattern 12-3 may emit green light to the color filter CF2c.

Main light L11 emitted from the first grating pattern 12-1 travels to the color filter CF2a. However, due to the spreading of light, a part L12 of the light emitted from the first grating pattern 12-1 may travel to the color filter CF2b. Likewise, main light L31 emitted from the third grating pattern 12-3 travels to the color filter CF2c, but a part L32 of the light emitted from the third grating pattern 12-3 travels to the color filter CF2b. In this aspect, not only light L21 emitted from the second grating pattern 12-2 that corresponds to the color filter CF2b, but also the light L12 and the light L32 emitted from other grating patterns 12-1 and 12-3, respectively, may be incident to the color filter CF2b. Light incident to a filter from a grating pattern that does not correspond to the filter functions as noise, thereby causing crosstalk. The crosstalk may be aggravated as an interval between pixels decreases due to a high resolution of the image display apparatus.

In a directional backlight unit BLU1 according to an exemplary embodiment, grating patterns GP are configured to reduce the spreading of light caused by the grating patterns GP and to minimize crosstalk caused by the spreading of light.

Although the light source LS is illustrated as emitting light to a side of the light guide plate LGP in FIG. 1, an exemplary embodiment is not limited to this illustration.

Figure 7:
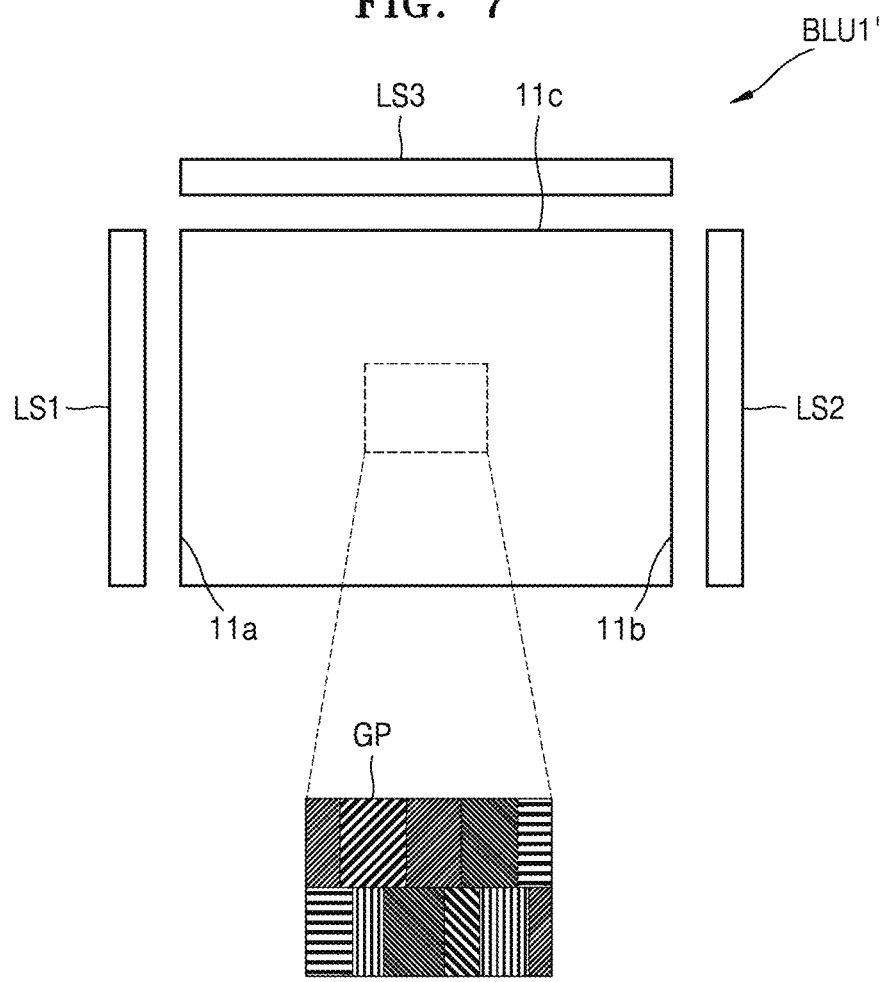
FIG. 7 is a plane view illustrating a structure of a directional backlight unit, according to another exemplary embodiment.

FIG. 7 is a plane view illustrating a structure of a directional backlight unit BLU1', according to another exemplary embodiment.

The directional backlight unit BLU1' according to the current exemplary embodiment is different from the directional backlight unit BLU1 illustrated in FIG. 1.

Referring to FIG. 7, a directional backlight unit BLU1' may include a first light source LS1 that emits light in a first wavelength band, a second light source LS2 that emits light in a second wavelength band, and a third light source LS3 that emits light in a third wavelength band. For example, the first light source LS1 may emit blue light, the second light source LS2 may emit green light, and the third light source LS3 may emit red light. The first light source LS1 is disposed in a first side direction with respect to the light guide plate LGP, the second light source LS2 is disposed in a second side direction with respect to the light guide plate LGP, and the third light source LS3 is disposed in a third side direction with respect to the light guide plate LGP. The light guide plate LGP may include a first incident surface 11a upon which light from the first light source LS1 is incident, a second incident surface 11b upon which light from the second light source LS2 is incident, and a third incident surface 11c upon which light from the third light source LS3 is incident. However, the arrangement of light sources is not limited to this illustration, and the light sources may be arranged in various ways. For example, the first light source LS1, the second light source LS2, and the third light source LS3 may be arranged alternately at a side of the light guide plate LGP. An incident direction of color light emitted from each of the first light source LS1, the second light source LS2, and the third light source LS3 with respect to the light guide plate may vary.

Figure 8:
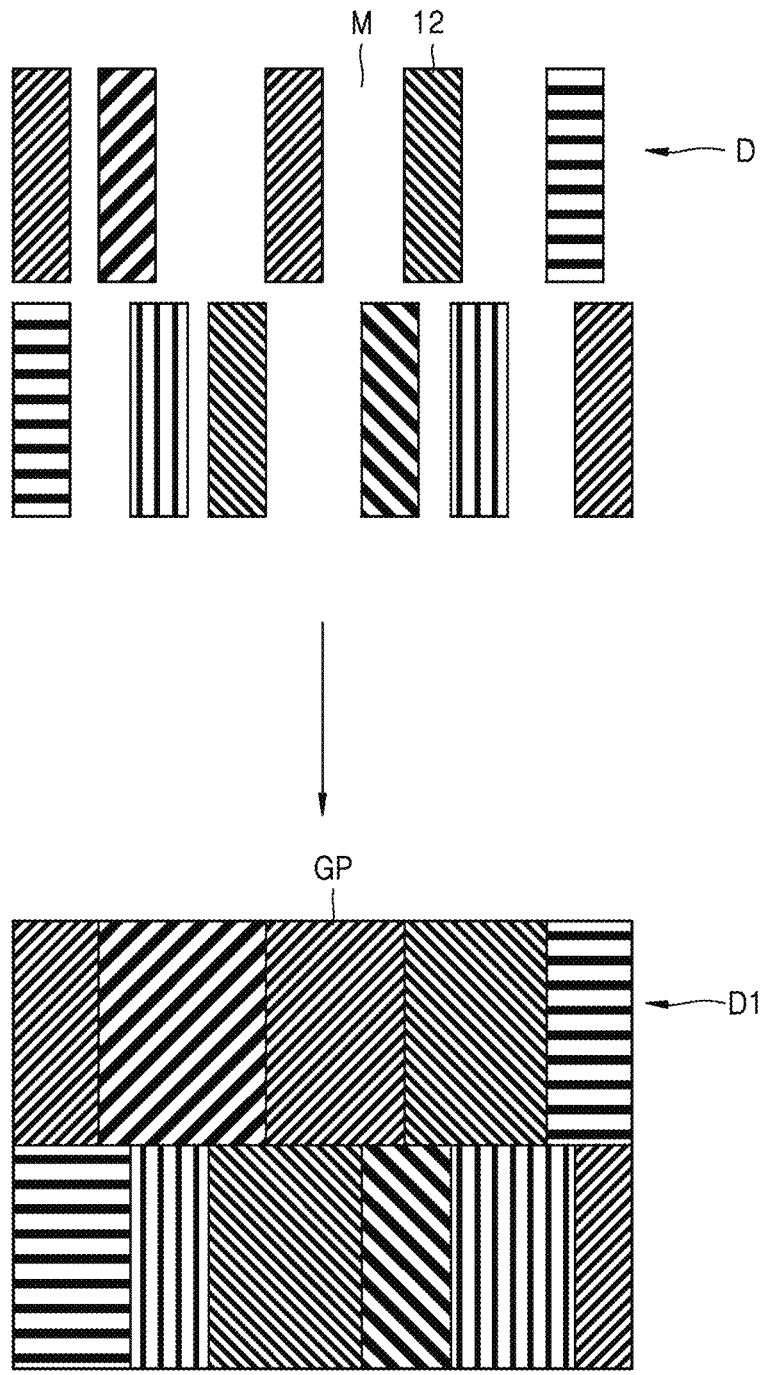
FIG. 8 is a plane view for comparing grating patterns included in a diffractive element of a directional backlight unit illustrated in FIG. 1 with grating patterns included in a diffractive element of a backlight unit illustrated in FIG. 3, according to the comparison example.

FIG. 8 is a plane view for comparing the grating patterns GP included in the diffractive element D1 of the directional backlight unit BLU1 illustrated in FIG. 1 with the grating patterns 12 included in the diffractive element D of the backlight unit BLU illustrated in FIG. 3 according to the comparison example.

Referring to FIG. 8, an interval between the grating patterns 12 provided in the diffractive element D of the backlight unit BLU according to the comparison example may be similar to a length and a width of the grating patterns 12. In particular, the interval between the grating patterns 12 may be equal to approximately several micrometers (μm). In this case, the region where the grating pattern 12 is formed and the region M where the grating pattern 12 is not formed may have different average refractive indices. The region M where the grating pattern 12 is not formed functions as a slit, thereby causing an increase in the spreading of light emitted from the grating pattern 12.

By contrast, the grating patterns GP provided in the diffractive element D1 of the directional backlight unit BLU1 according to an exemplary embodiment are arranged to be adjacent to each other, such that an interval between the grating patterns GP may be smaller than the length and the width of the grating pattern GP to a negligible extent. As the region where the grating pattern GP is not formed nearly disappears due to reduction of the interval between the grating patterns GP, the spreading of light emitted from the grating pattern GP may be reduced.

When the grating patterns GP are arranged to be adjacent to each other, the interval therebetween may not be equal to zero because of an error in processing, a pitch interval of the grating pattern GP, and so forth. For example, an interval between the grating patterns GP may be less than 1/10 of a wavelength of light emitted by the light source LS. If the interval between the grating patterns GP is less than 1/10 of the wavelength of the light, then the amount of light lost by the spreading of the light in a space between the grating patterns GP may be reduced significantly. Moreover, as the amount of light lost by the spreading of the light is reduced, the crosstalk may also be reduced.

In order to ensure that the interval between the grating patterns GP is less than 1/10 of the wavelength of the light, an area of each grating pattern GP provided in the diffractive element D1 of the directional backlight unit BLU1 according to an exemplary embodiment may be larger than an area of the grating pattern 12 according to the comparison example.

Alternatively, in a modified example, a greater number of grating patterns GP than the grating patterns 12 provided in the diffractive element D according to the comparison example may be formed in the diffractive element D1 of the directional backlight unit BLU1 according to an exemplary embodiment.

However, if the number of grating patterns GP provided in the diffractive element D1 increases, it may be difficult to use all the light emitted from the grating patterns GP in generation of an image. This is because as the interval between the grating patterns GP is restricted by the increase in the number of grating patterns GP, the grating patterns GP may become increasingly difficult to design. In this regard, in a range that satisfies the aforementioned interval conditions, the number of grating patterns GP or an area of each grating pattern GP may be properly set.

Hereinbelow, a structure of a directional backlight unit according to various exemplary embodiments will be described.

Figure 9:
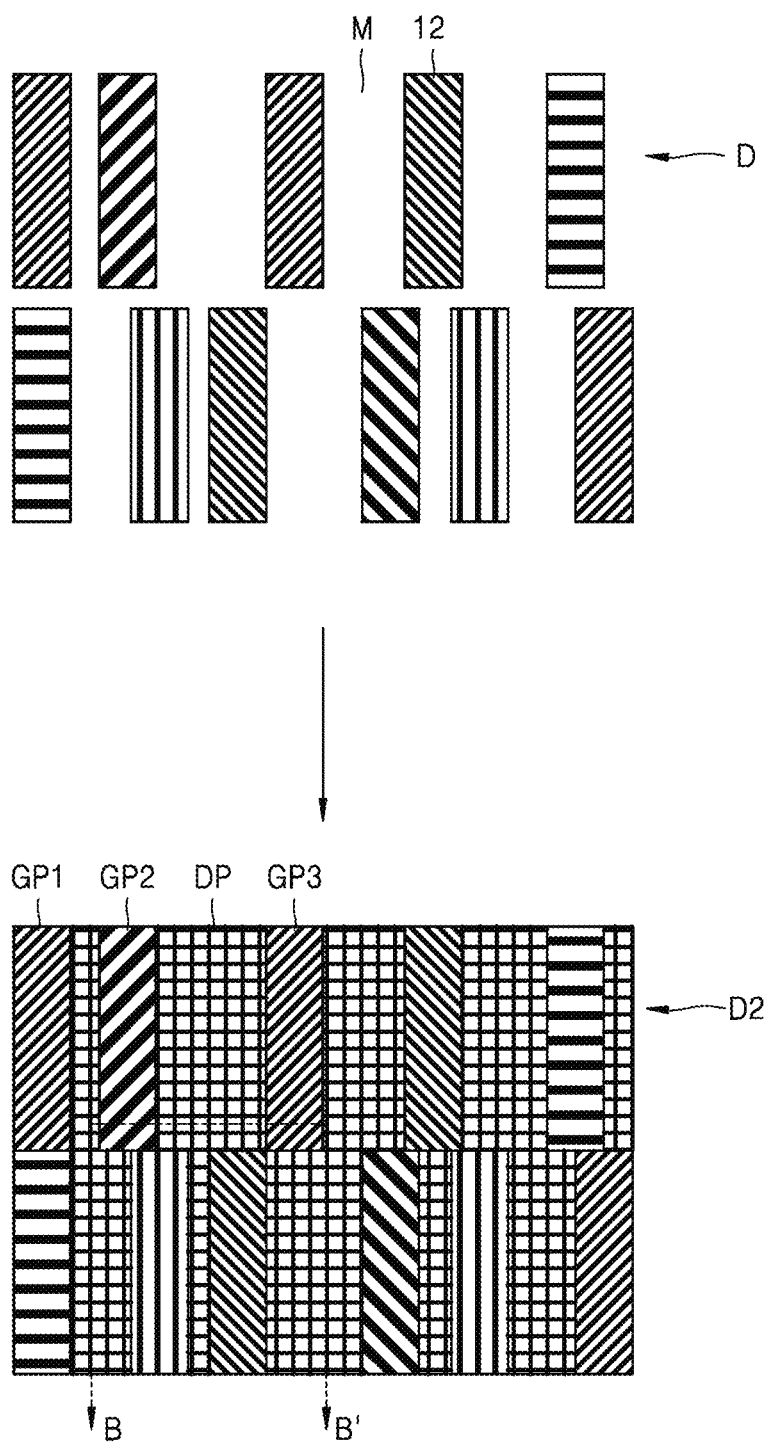
FIG. 9 is a plane view for comparing grating patterns included in a diffractive element of a directional backlight unit according to another exemplary embodiment with grating patterns included in a diffractive element of a backlight unit according to the comparison example.

FIG. 9 is a plane view for comparing grating patterns included in a diffractive element D2 of a directional backlight unit, according to another exemplary embodiment with grating patterns included in the diffractive element D of the backlight unit according to the comparison example.

The diffractive element D2 according to the current exemplary embodiment may include a plurality of grating patterns GP1, GP2, GP3, . . . , and a dummy grating pattern DP. When compared to the diffractive element D, the dummy grating pattern DP may be positioned between the grating patterns 12, that is, in the region M where the grating pattern 12 is not formed among regions on the exit surface of the light guide plate.

When the directional backlight unit is applied to an image display apparatus, light that propagates through the plurality of grating patterns GP1, GP2, GP3, . . . is used for generation of an image, whereas light from the dummy grating pattern DP may not be used for image generation. This will be further described below. In this sense, the plurality of grating patterns GP1, GP2, GP3, . . . may be referred to as panel-oriented grating patterns GP1, GP2, GP3, . . . by comparison with the dummy grating pattern DP.

The dummy grating pattern DP may have such a shape that an average refractive index of the diffractive element D2 is almost uniform over the exit surface of the light guide plate.

Figure 10:
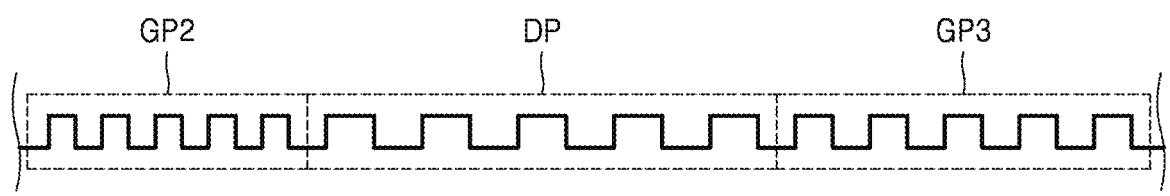
FIG. 10 is a cross-sectional view of a diffractive element as viewed from a line B-B' of FIG. 9.

FIG. 10 is a cross-sectional view of the diffractive element D2 as viewed from a line B-B' of FIG. 9.

Referring to FIG. 10, since the dummy grating pattern DP and the panel-oriented grating patterns GP2 and GP3 have different light-emission characteristics, the structure of the dummy grating pattern DP and the structures of the panel-oriented grating patterns GP2 and GP3 may be different from each other. For example, at least one of a pitch, a width, and a direction of gratings of the dummy grating pattern DP may be different from the corresponding parameter of the panel-oriented grating patterns GP2 and GP3 that are adjacent to the dummy grating pattern DP.

Conversely, the average refractive index of the dummy grating pattern DP may be almost equal to those of the panel-oriented grating patterns GP2 and GP3 that are adjacent to the dummy grating pattern DP. For example, a pattern shape of the dummy grating pattern DP may be such that the average refractive index of the dummy grating pattern DP is almost equal to or similar to those of the panel-oriented grating patterns GP2 and GP3 that are arranged adjacent to the dummy grating pattern DP. For example, the average refractive index of the dummy grating pattern DP may be equal to that of at least any one of the panel-oriented grating patterns GP2 and GP3 that are adjacent to the dummy grating pattern DP. In this way, the average refractive indices of the grating patterns GP1, GP2, GP3, . . . , DP are almost uniform, such that the surface of the light guide plate LGP may have an almost uniform refractive index. Thus, the spreading of light caused by heterogeneity and crosstalk caused by the spreading of light may be reduced as described above.

As such, the dummy grating pattern DP is provided to reduce the heterogeneity of the exit surface ES of the light guide plate LGP in the diffractive element D2, and thus designing must be performed in order to minimize an influence of light from the dummy grating pattern DP upon a 3D image.

Figure 11:
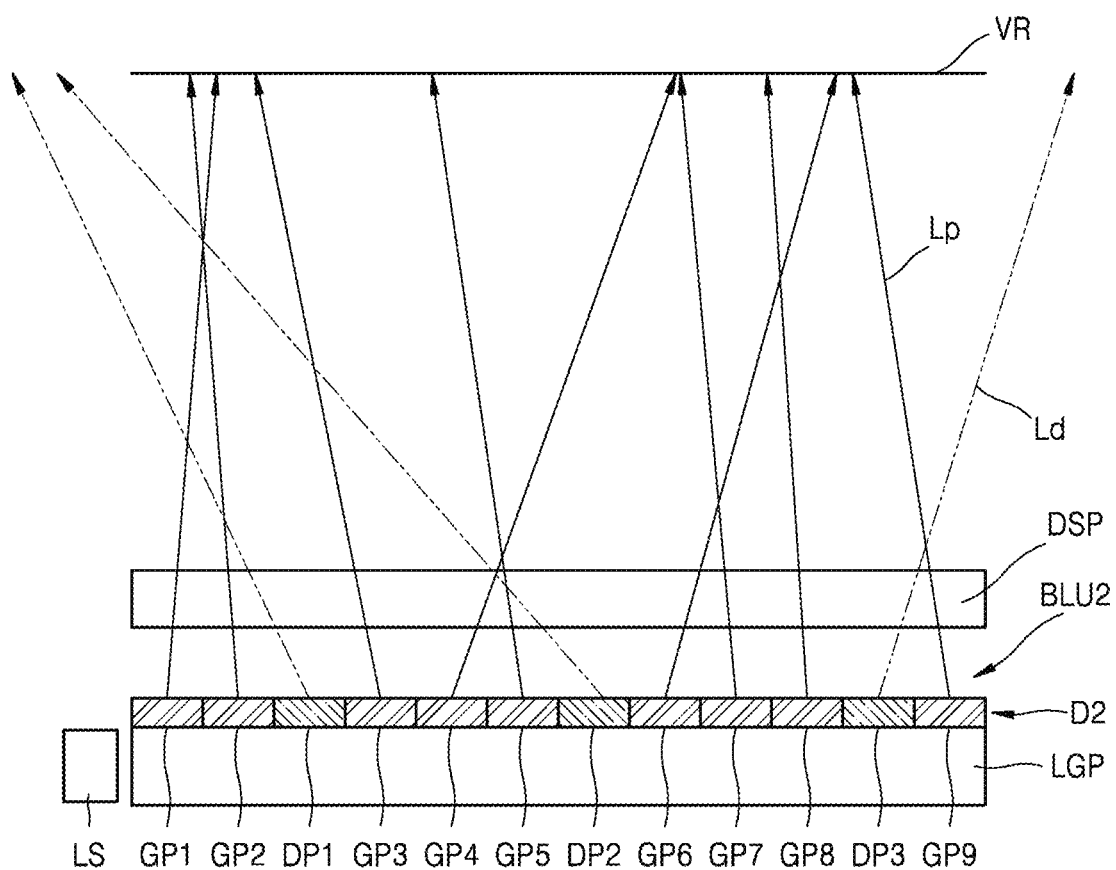
FIG. 11 illustrates a traveling direction of light emitted from each of a plurality of panel directional grating patterns and a traveling direction of light emitted from each of a plurality of dummy grating patterns, when a directional backlight unit that includes a diffractive element illustrated in FIG. 9 is applied to an image display apparatus.

FIG. 11 illustrates a traveling direction of light emitted from each of a plurality of panel-oriented grating patterns GP1 through GP9 and a traveling direction of light emitted from each of a plurality of dummy grating patterns DP1, DP2, and DP3, when the directional backlight unit BLU2 that includes the diffractive element D2 illustrated in FIG. 9 is applied to an image display apparatus.

Referring to FIG. 11, the plurality of panel-oriented grating patterns GP1, GP2, GP3, GP4, GP5, GP6, GP7, GP8, and GP9 may be configured so that light Lp emitted from the plurality of panel-oriented grating patterns GP1 through GP9, respectively, may travel to a display panel DSP provided on an exit surface of the light guide plate LGP. At least two of the plurality of panel-oriented grating patterns GP1 through GP9 are configured to emit light in different wavelength bands toward the display panel DSP. In particular, at least two of the plurality of panel-oriented grating patterns GP1 through GP9 may have selectivity with respect to different wavelengths. A least two of the plurality of panel-oriented grating patterns GP1 through GP9 may also be configured to emit light in different directions. For example, the plurality of panel-oriented grating patterns GP1 through GP9 may emit light in a specific direction according to a pitch, a direction, a refractive index, and a duty ratio of a grating, and a relative angle between a traveling direction of light and a grating.

To emit light in directions different from those of the plurality of panel-oriented grating patterns GP1 through GP9, at least one of a pitch of a grating, a direction of a grating, and a relative angle between a traveling direction of light and a grating of the plurality of dummy grating patterns DP1, DP2, and DP3 may be different from the corresponding parameter of the plurality of panel-oriented grating patterns GP1 through GP9.

The plurality of dummy grating patterns DP1, DP2, and DP3 may be configured to prevent light Ld emitted from each of the plurality of dummy grating patterns DP1, DP2, and DP3 from traveling toward a viewing region VR of the display panel DSP.

Herein, the viewing region VR refers to a region within which light incident to the display panel DSP is used to generate an image viewed by a viewer. In this aspect, the light Ld directed outside the viewing region VR on the display panel DSP may not be used to generate an image, or may be used to generate an image outside a viewing angle of the viewer.

In this way, the light emitted from each of the plurality of dummy grating patterns DP1, DP2, and DP3 may not be used to generate an image on the display panel DSP. The plurality of dummy grating patterns DP1, DP2, and DP3 may cause light to travel outside a viewing angle of a 3D image or in a direction in which the light does not pass through the display panel DSP.

Although the light emitted from each of the plurality of dummy grating patterns DP1, DP2, and DP3 is illustrated as being directed outside of a viewing angle in FIG. 11, the present disclosure is not limited to this illustration. For example, the orientation of the light may be set toward a black matrix of a color filter layer included in the display panel DSP.

Figure 12:
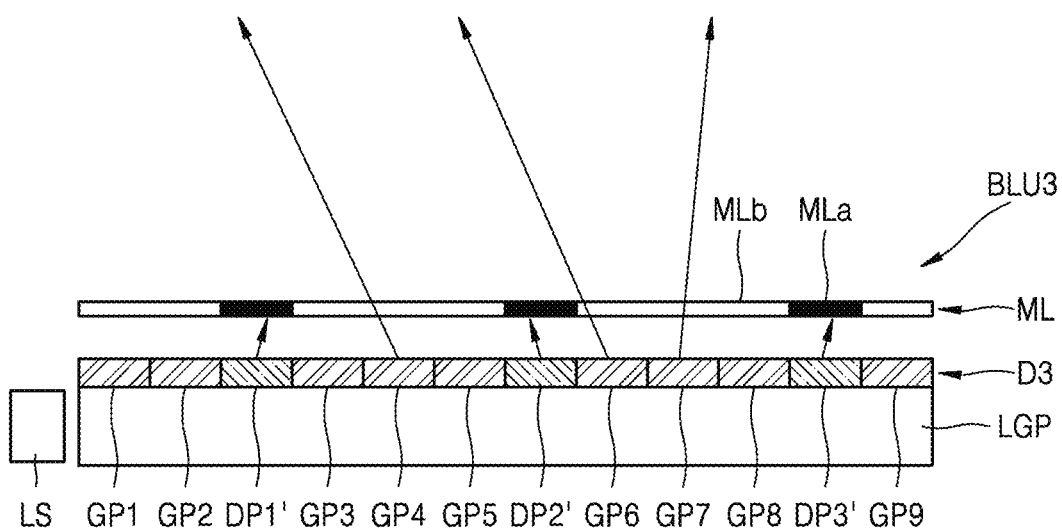
FIG. 12 is a cross-sectional view illustrating a structure of a directional backlight unit, according to another exemplary embodiment.

FIG. 12 is a plane view illustrating a structure of a directional backlight unit BLU3, according to another exemplary embodiment.

The directional backlight unit BLU3 according to the current exemplary embodiment is different from the directional backlight unit BLU2 illustrated in FIG. 11 in a sense that the directional backlight unit BLU3 further includes a dummy light blocking layer ML.

A diffractive element D3 included in the directional backlight unit BLU3 may include the plurality of panel-oriented grating patterns GP1, GP2, GP3, GP4, GP5, GP6, GP7, GP8, and GP9 and a plurality of dummy grating patterns DP1', DP2', and DP3'. The plurality of dummy grating patterns DP1', DP2', and DP3' have average refractive indices that are similar to that of at least any one of panel-oriented grating patterns, which are adjacent to each of the plurality of dummy grating patterns DP1', DP2', and DP3', and in this sense, the plurality of dummy grating patterns DP1', DP2', and DP3' are substantially similar to the plurality of dummy grating patterns DP1, DP2, and DP3.

In the directional backlight unit BLU3 according to the current exemplary embodiment, the plurality of dummy grating patterns DP1', DP2', and DP3' do not need to be directed outside a viewing angle, unlike the plurality of dummy grating patterns DP1, DP2, and DP3 in FIG. 11. Instead, the directional backlight unit BLU3 may further include the dummy light blocking layer ML that directly blocks light from the plurality of dummy grating patterns DP1', DP2', and DP3' with respect to the directional backlight unit BLU3.

The dummy light blocking layer ML is located on the diffractive element D3, and may further include a plurality of light blocking regions MLa. On the dummy light blocking layer ML, the other regions except for the plurality of light blocking regions MLa may be opening regions MLb that enable light to pass therethrough. The light blocking regions MLa may be configured not to pass light from each of the plurality of dummy grating patterns DP1', DP2', and DP3' therethrough. In particular, light emitted from each of the plurality of panel-oriented grating patterns GP1 through GP9 is emitted through the opening regions MLb of the dummy light blocking layer ML, and light from each of the plurality of dummy grating patterns DP1', DP2', and DP3' is blocked by the light shielding regions MLa. Using this structure, when the directional backlight unit BLU3 is applied to the image display apparatus, the light emitted from each of the dummy grating patterns DP1', DP2', and DP3' may not arrive at a pixel region of the display panel.

Figure 13:
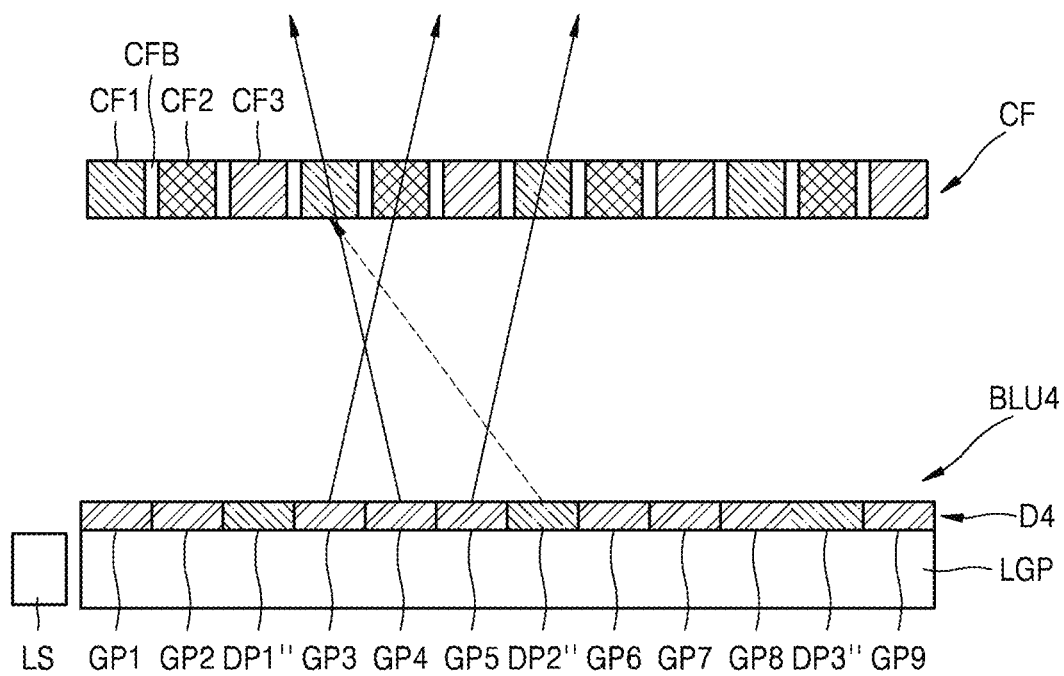
FIG. 13 is a cross-sectional view illustrating a structure of a directional backlight unit, according to another exemplary embodiment.

FIG. 13 is a plane view illustrating a structure of a directional backlight unit BLU4, according to another exemplary embodiment.

The directional backlight unit BLU4 according to the current exemplary embodiment is different from the directional backlight unit BLU2 of FIG. 11 in terms of a pattern shape of dummy grating patterns DP1", DP2", and DP3" included in a diffractive element D4.

The diffractive element D4 may include the plurality of panel-oriented grating patterns GP1, GP2, GP3, GP4, GP5, GP6, GP7, GP8, and GP9 and the plurality of dummy grating patterns DP1", DP2", and DP3". The plurality of dummy grating patterns DP1", DP2", and DP3" have average refractive indices that are similar to that of at least any one of panel-oriented grating patterns which are adjacent to each of the plurality of dummy grating patterns DP1", DP2", and DP3", and in this sense, the plurality of dummy grating patterns DP1", DP2", and DP3" are substantially similar to the plurality of dummy grating patterns DP1, DP2, and DP3.

In the directional backlight unit BLU4 according to the current exemplary embodiment, each of the plurality of dummy grating patterns DP1", DP2", and DP3" has a pattern shape such that an oriented pixel color and a wavelength selectivity are different from each other.

In FIG. 13, a traveling direction of light emitted from each of the plurality of panel-oriented grating patterns GP1 through GP9 and a traveling direction of light emitted from each of the plurality of dummy grating patterns DP1", DP2", and DP3" are illustrated together with a color filter layer CF provided on a display panel when the directional backlight unit BLU4 is applied to the image display apparatus.

Referring to FIG. 13, the light from the directional backlight unit BLU4 is directed toward the color filter layer CF provided on the display panel. The color filter layer CF may include a plurality of color filters CF1, CF2, and CF3. The color filter layer CF may include a first color filter CF1 that passes light in a first wavelength band therethrough, a second color filter CF2 that passes light in a second wavelength band therethrough, and a third color filter CF3 that passes light in a third wavelength band. A black matrix CFB may be disposed in the first, second, and third color filters CF1, CF2, and CF3.

The plurality of panel-oriented grating patterns GP1 through GP9 may be configured to cause the light Lp emitted from each of the plurality of panel-oriented grating patterns GP1 through GP9 to pass any one of the plurality of color filters CF1, CF2, and CF3. Each of the plurality of panel-oriented grating patterns GP1 through GP9 may selectively emit light in any one of the first, second, and third wavelength bands. The wavelength selectivity of each of the plurality of panel-oriented grating patterns GP1 through GP9 may match a pixel color desired by each of the plurality of panel-oriented grating patterns GP1 through GP9.

Conversely, the plurality of dummy grating patterns DP1", DP2", and DP3" may be configured to prevent the light Ld emitted from each of the plurality of dummy grating patterns DP1", DP2", and DP3" from passing through the color filters CF1, CF2, and CF3 of the color filter layer CF. In particular, for the wavelength selectivity of each of the plurality of dummy grating patterns DP1", DP2", and DP3", a pattern shape may be set to be different from the pixel color oriented by each of the plurality of dummy grating patterns DP1", DP2", and DP3".

The wavelength selectivity of the dummy grating pattern DP2" may not overlap the wavelength band of the color filter CF1 oriented by the dummy grating pattern DP2". For example, if the wavelength selectivity of the dummy grating pattern DP2" may be the second wavelength band or the third wavelength band and the dummy grating pattern DP2" is oriented toward the color filter CF1 that passes the first wavelength band, then the light from the dummy grating pattern DP2" is blocked by the color filter CF2, thereby failing in contributing to generation of an image.

As described with reference to FIGS. 11, 12, and 13, average refractive indices on the exit surface ES of the light guide plate LGP are almost uniform due to the plurality of dummy grating patterns DP1, DP2, and DP3 provided in the directional backlight unit BLU2, the plurality of dummy grating patterns DP1', DP2', and DP3' provided in the directional backlight unit BLU3, and the plurality of dummy grating patterns DP1", DP2", and DP3" provided in the directional backlight unit BLU4, thereby reducing the spreading of the light Lp emitted from each of the plurality of panel-oriented grating patterns GP1 through GP9. As the spreading of light is reduced, crosstalk may also be reduced.

Moreover, as described with reference to FIGS. 11, 12, and 13, a pattern shape is formed to direct the light Ld emitted from each of the plurality of dummy grating patterns DP1, DP2, and DP3 outside a viewing angle, or light from each of the plurality of dummy grating patterns DP1', DP2', and DP3' is blocked, or the wavelength selectivity of each of the plurality of dummy grating patterns DP1", DP2", and DP3" is different from an oriented color filter, thereby blocking the light from each of the plurality of dummy grating patterns DP1", DP2", and DP3" by the color filter layer CF. Consequently, there may be a relatively small influence of dummy grating patterns upon generation of a 3D image.

Additionally or selectively, the plurality of dummy grating patterns DP1, DP2, and DP3, the plurality of dummy grating patterns DP1', DP2', and DP3', and the plurality of dummy grating patterns DP1", DP2", and DP3" illustrated in FIGS. 11, 12, and 13 may have a lower rate of light emitted outside the light guide plate LGP than that of the panel-oriented grating patterns GP1 through GP9. In particular, the light-emitting efficiencies of the plurality of dummy grating patterns DP1, DP2, and DP3, the plurality of dummy grating patterns DP1', DP2', and DP3', and the plurality of dummy grating patterns DP1", DP2", and DP3" may be lower than the corresponding light-emitting efficiencies of the plurality of panel-oriented grating patterns GP1 through GP9.

Figure 14:
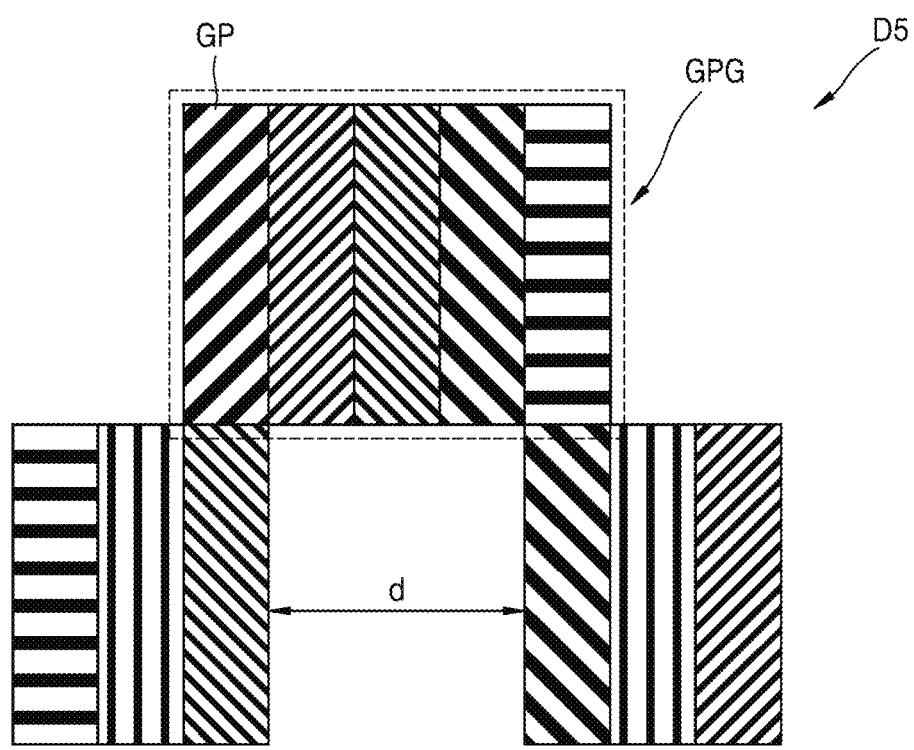
FIG. 14 is a plane view illustrating a structure of diffractive element included in a directional backlight unit, according to another exemplary embodiment.

FIG. 14 is a plane view illustrating a structure of diffractive element D5 included in a directional backlight unit, according to another exemplary embodiment.

Referring to FIG. 14, an interval between a plurality of grating patterns GP provided in the diffractive element D5 may satisfy at least one condition of a first range less than approximately $1/10$ of a wavelength of light emitted from the light source LS and a second range greater than approximately $180/\pi$ times of the wavelength of the light.

For example, a grating pattern group GPG is formed by a plurality of grating patterns GP, such that an interval between the grating patterns GP included in the grating pattern group GPG may satisfy the condition of the first range less than approximately $1/10$ of the wavelength of the light emitted by the light source LS.

An interval d between the grating pattern groups GPG may satisfy the condition of the second range greater than approximately $180/\pi$ of the wavelength of the light emitted by the light source LS. Generally, an angle at which the light spreads while passing through a slit varies inversely proportionally with respect to a width of the slit. Thus, as the interval d between the grating pattern groups GPG increases, the angle at which the light spreads while passing through the grating pattern GP may be reduced. For example, as described above, if the interval d between the grating pattern groups GPG is greater than about $180/\pi$ times of the wavelength of the light emitted from the light source LS, the angle at which the light passing through the grating pattern GP further spreads due to refraction of the light is reduced to about 1 degree or less, such that the crosstalk of a 3D image formed by the light emitted from a grating may be reduced.

For example, when the light source LS emits light in a plurality of wavelength bands, the second range may exceed about $180/\pi$ times the smallest wavelength among wavelengths of the light emitted from the light source LS. In another example, when the light source LS emits light in a plurality of wavelength bands, the second range may exceed $180/\pi$ times the intermediate wavelength among wavelengths of the light emitted from the light source LS.

If the light source LS emits visible light that has a wavelength that falls within a range of between 380 nm and 780 nm, an intermediate wavelength of approximately 550 nm of the visible light may be set to a representative wavelength, such that the second range may exceed approximately $180/\pi$ times 550 nm. For example, the first range may be regarded as the wavelength of the visible light and may be set less than 50 nm. The second range may be set greater than 30 μm. In this aspect, the interval between the grating patterns GP may satisfy at least one condition of a third range less than 50 nm and a fourth range greater than 30 μm.

Hereinafter, the image display apparatus that includes the directional backlight unit will be described.

Figure 15:
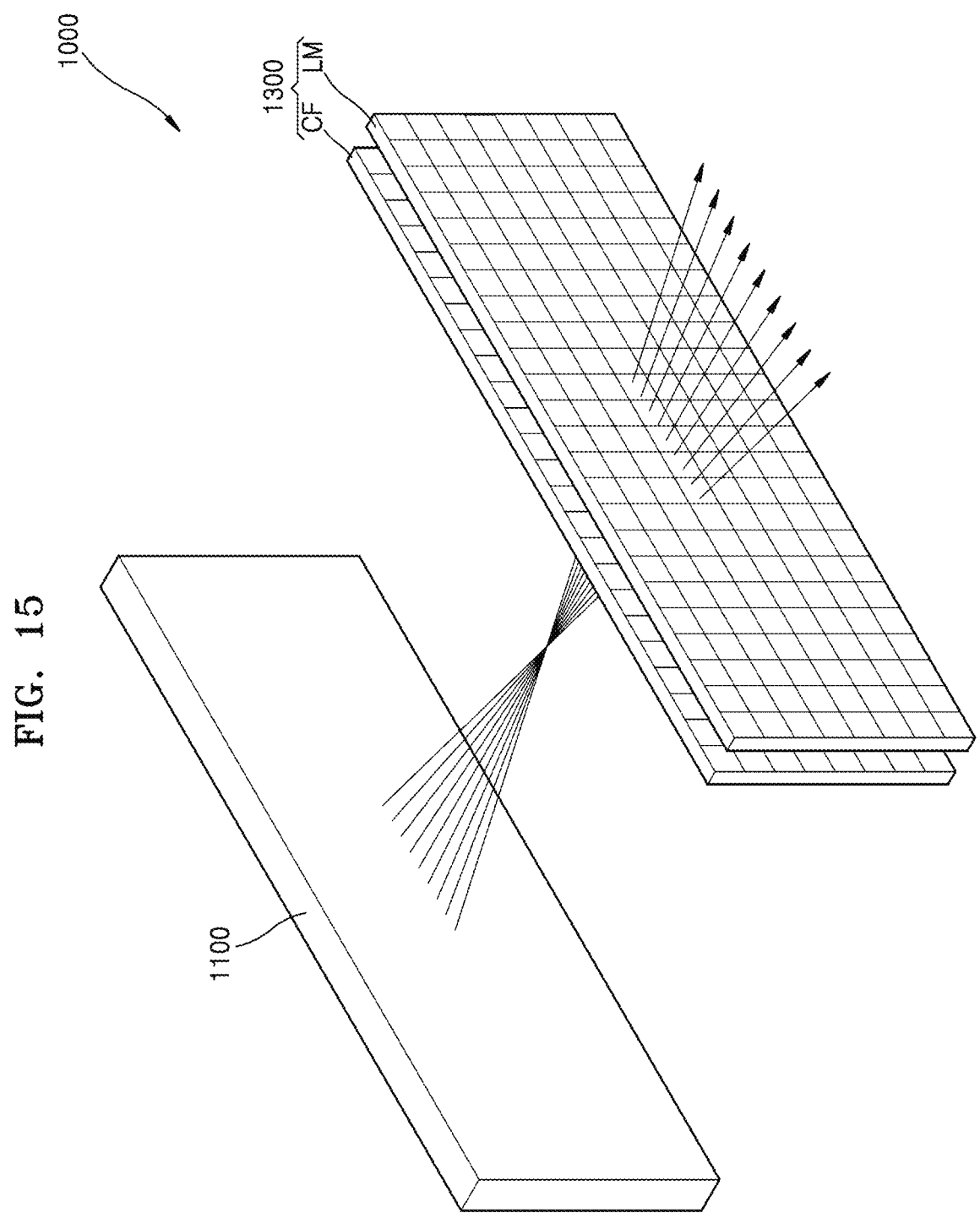
FIG. 15 is a perspective view of an image display apparatus, according to an exemplary embodiment.

FIG. 15 is a perspective view of an image display apparatus 1000, according to an exemplary embodiment.

Referring to FIG. 15, the image display apparatus 1000 may include a directional backlight unit (or directional backlight device) 1100 and a display panel 1300.

The display panel 1300 modulates light emitted by the directional backlight unit 1100 based on 3D image information and displays a 3D image. The display panel 1300 may include a color filter layer CF and a light modulation layer LM.

The color filter layer CF may include a plurality of color filters arranged two-dimensionally, in which color filters configured to enable a propagation of light in different wavelength bands therethrough are arranged alternately repeatedly (i.e., in a repeating pattern).

The light modulation layer LM may include a plurality of color filters provided in the color filter layer CF and a plurality of light modulation regions that respectively correspond to the plurality of color filters. The plurality of light modulation regions may be separately controlled based on image information.

Illustrated positions in which the light modulation layer LM and the color filter layer CF are arranged are not limited to the illustration, and arrangement orders may be interchanged.

In FIG. 15, for the display panel 1300, only main components, that is, the color filters CF and the light modulation layers LM are illustrated, and pixel electrodes, common electrodes, thin film transistor (TFT) array layers, etc., may be further included as components for driving an individual light modulation region, and an optical film such as a polarization plate, etc., may also be included.

The directional backlight unit 1100 may be any one of the above-described directional backlight units according to various exemplary embodiments, and may include at least any one of various diffractive elements D1, D2, D3, D4, and D5. Light emitted from each of grating patterns provided in a diffractive element is incident to a corresponding pixel of the display panel 1300. In each light modulation region of the light modulation layer LM of the display panel 1300, light incident from the directional backlight unit 1100 is modulated properly according to an orientation and a color, thereby displaying a 3D image.

The image display apparatus 1000 according to an exemplary embodiment may display a plurality of views based on a grating pattern provided in the directional backlight unit 1100. Herein, the view may indicate one image shown to one eye of the viewer. However, the present disclosure is not limited to this example, and two or more view images shown to one eye of the viewer may also be displayed.

The directional backlight unit 1100 provided in the image display apparatus 1000 has an arrangement shape that is configured to minimize the spreading of light caused by a grating pattern that provides an orientation toward a plurality of viewing zones. Thus, the image display apparatus 1000 may display a good 3D image that reduces crosstalk.

FIGS. 16A, 16B, 16C and 17 are computer simulation results showing effects of exemplary embodiments together with a comparison example.

Figure 16A:
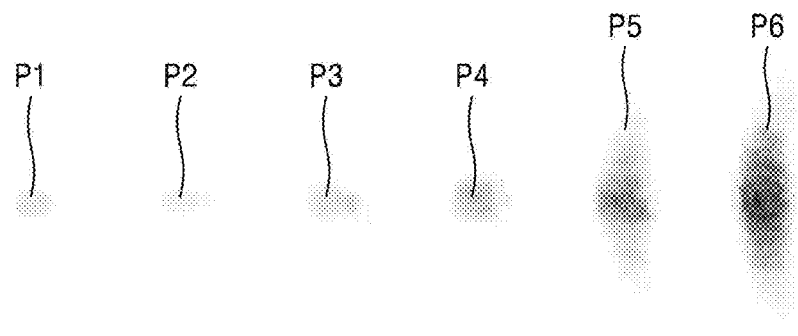
FIGS. 16A, 16B, 16C and 17 are computer simulation results showing effects of exemplary embodiments together with a comparison example.
Figure 16B:
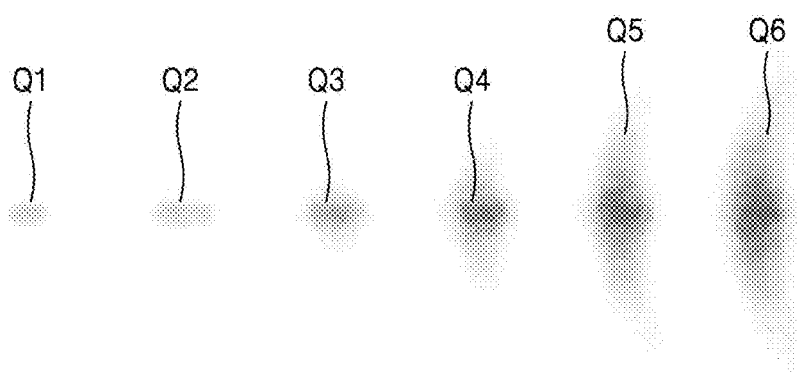
Figure 16C:
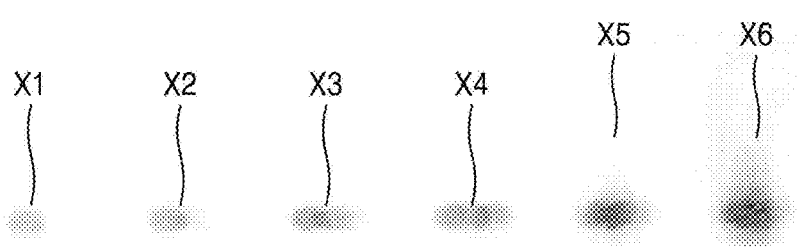

FIGS. 16A, 16B and 16C shows the spreading of light caused by the diffractive element D in the backlight unit BLU according to the comparison example illustrated in FIG. 3 and the spreading of light in the directional backlight unit illustrated in FIG. 14.

FIG. 16A shows a change in a cross-sectional shape of light emitted from the backlight unit BLU of FIG. 3, and FIG. 16B shows a change in a cross-sectional shape of light emitted from the backlight unit that includes the diffractive element D5 of FIG. 14.

FIG. 16A, P1 indicates a cross-sectional shape, as manifested on an exit surface, of light reflected once from the light guide plate 10, P2 indicates a cross-sectional shape, as manifested on the exit surface, of light reflected twice from the light guide plate 10, P3 indicates a cross-sectional shape, as manifested on the exit surface, of light reflected three times from the light guide plate 10, P4 indicates a cross-sectional shape, as manifested on the exit surface, of light reflected four times from the light guide plate 10, P5 indicates a cross-sectional shape, as manifested on the exit surface, of light reflected five times from the light guide plate 10, and P6 indicates a cross-sectional shape, as manifested on the exit surface, of light reflected six times from the light guide plate 10.

FIG. 16C, X1 indicates a cross-sectional shape, as manifested on an exit surface, of light reflected once from the light guide plate LGP, X2 indicates a cross-sectional shape, as manifested on the exit surface, of light reflected twice from the light guide plate LGP, X3 indicates a cross-sectional shape, as manifested on the exit surface, of light reflected three times from the light guide plate LGP, X4 indicates a cross-sectional shape, as manifested on the exit surface, of light reflected four times from the light guide plate LGP, X5 indicates a cross-sectional shape, on the exit surface, as manifested of light reflected five times from the light guide plate LGP, and X6 indicates a cross-sectional shape, on the exit surface, as manifested of light reflected six times from the light guide plate LGP.

Referring to FIG. 16A, as light travels inside the light guide plate 10, the light is reflected in the grating pattern 12 provided on the exit surface of the light guide plate 10, such that the cross section of the light may increase. In this aspect, due to the spreading of the light, the cross-section of the light may increase.

Conversely, referring to FIG. 16C, as light travels inside the light guide plate LGP, even if the light is reflected in the grating pattern GP provided on the exit surface of the light guide plate LGP, such that the degree to which the cross-section of the light increases may be smaller than that of the comparison example. In particular, when compared to FIG. 16A, the spreading of the light may be reduced.

Figure 17:
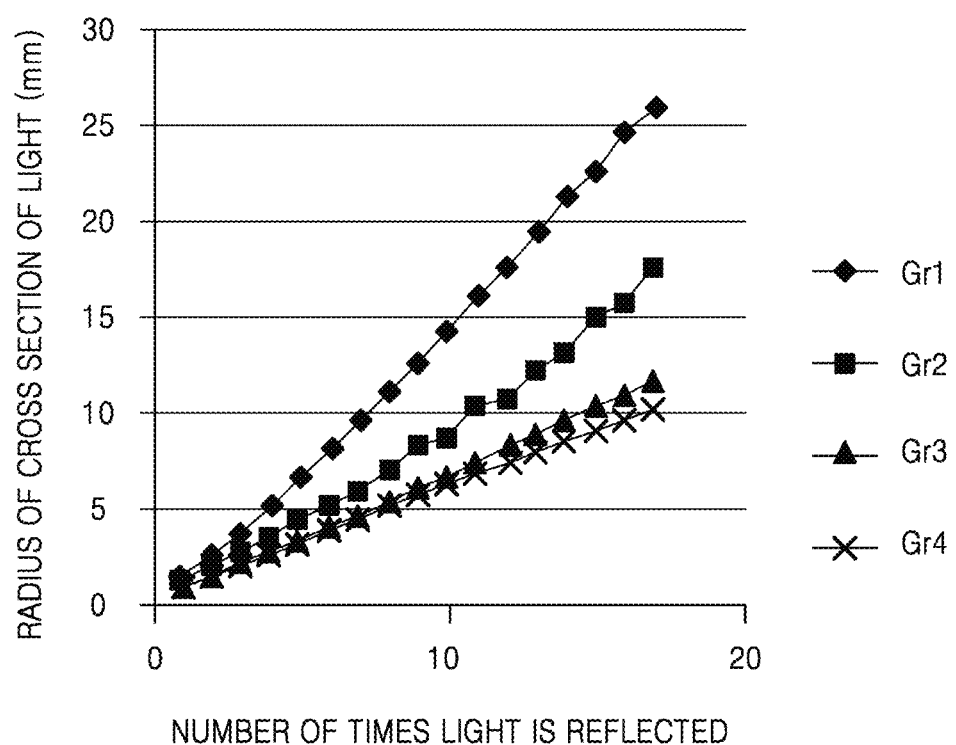

FIG. 17 shows, as graphs, results of calculating a change in the radius of the cross-section of the light with respect to the number of times the light is reflected from the exit surface of each of the light guide plates 10 and LGP of the directional backlight units according to the comparison example and the exemplary embodiments, as obtained via a computer simulation.

In FIG. 17, a graph Gr1 corresponds to a case when the directional backlight unit BLU according to the comparison example illustrated in FIG. 3 is used, a graph Gr2 corresponds to a case when the directional backlight unit BLU1 according to the exemplary embodiment illustrated in FIG. 1 is used, a graph Gr3 corresponds to a case when the directional backlight unit including the diffractive element D5 illustrated in FIG. 14 is used, and a graph Gr4 corresponds to a case when a backlight unit having no grating pattern on a light guide plate is used.

Referring to FIG. 17, as indicated by the graph Gr1, for the backlight unit according to the comparison example, as the number of times light is reflected from the light guide plate 10 increases, the diameter of the cross-section of the light may sharply increase. Conversely, as indicated by the graphs Gr2 and Gr3, for the directional backlight unit according to one or more exemplary embodiments, even if the number of times the light is reflected from the light guide plate LGP increases, the change in the diameter of the cross-section of the light is smaller than in the comparison example. In particular, the graph Gr3 almost matches the graph Gr4. In particular, for the directional backlight unit including the diffractive element D5 illustrated in FIG. 14, the spreading of the light in the grating pattern GP does not occur.

The above-described directional backlight unit may reduce the spreading of the light that occurs when the light passes through the grating pattern of the light guide plate.

Therefore, the image display apparatus that implements the directional backlight unit reduces crosstalk caused by the spreading of the light.

While the directional backlight unit and the image display apparatus including the same have been shown and described in connection with the exemplary embodiments, it will be apparent to those of ordinary skill in the art that modifications and variations can be made without departing from the spirit and scope of the exemplary embodiments as defined by the appended claims. Therefore, the disclosed exemplary embodiments should be considered in an illustrative sense rather than a restrictive sense. The range of the exemplary embodiments will be in the appended claims, and all of the differences in the equivalent range thereof should be understood to be included in the exemplary embodiments.

What is claimed is:

1. A directional backlight unit comprising:
   at least one light source configured to emit light; and
   a light guide plate configured to guide the light emitted by the at least one light source,
   wherein a plurality of grating patterns are provided on an exit surface of the light guide plate, each grating pattern being configured to direct the light to toward different respective viewing zones from among a plurality of viewing zones, and
   wherein an interval between adjacent grating patterns from among the plurality of grating patterns satisfies at least one condition from among a first range less than 1/10 of a wavelength of the light emitted by the light source and a second range greater than 180/π times the wavelength of the light emitted by the light source,
   wherein a repetition interval of a plurality of gratings of a grating pattern from among the plurality of grating patterns is constant across the grating pattern.

2. The directional backlight unit of claim 1, wherein the wavelength of the light emitted by the light source is within a range of between 380 nm and 780 nm.

3. The directional backlight unit of claim 2, wherein the interval between the adjacent grating patterns satisfies at least one condition from among a third range less than 50 nm and a fourth range greater than 30 μm.

4. The directional backlight unit of claim 1, wherein the plurality of grating patterns comprises a plurality of panel-oriented grating patterns that form directivities toward the plurality of viewing zones, and a plurality of dummy grating patterns respectively disposed between adjacent panel-oriented grating patterns from among the plurality of panel-oriented grating patterns.

5. The directional backlight unit of claim 4, further comprising a dummy light blocking layer comprising a plurality of light blocking regions that are configured to block light that propagates from each of the plurality of dummy grating patterns.

6. The directional backlight unit of claim 4, wherein an average refractive index of each dummy grating pattern from among the plurality of dummy grating patterns is substantially identical to an average refractive index of at least one panel-oriented grating pattern from among the plurality of panel-oriented grating patterns that is adjacent to each dummy grating pattern from among the plurality of dummy grating patterns.

7. The directional backlight unit of claim 6, wherein at least one from among a pitch of a grating and a direction of a grating of each dummy grating pattern from among the plurality of dummy grating patterns is different from at least one from among a pitch of a grating and a direction of at least one panel-oriented grating pattern from among the plurality of panel-oriented grating patterns that is adjacent to each dummy grating pattern from among the plurality of dummy grating patterns.

8. The directional backlight unit of claim 4, wherein a light emission efficiency of each dummy grating pattern from among the plurality of dummy grating patterns is lower than a light emission efficiency of each panel-oriented grating pattern from among the plurality of panel-oriented grating patterns.

9. The directional backlight unit of claim 1, wherein the at least one light source comprises a plurality of light sources configured to emit light of different wavelengths, wherein at least two grating patterns from among the plurality of grating patterns selectively refract the light of the different wavelengths.

10. An image display apparatus comprising:
    at least one light source configured to emit light;
    a light guide plate configured to guide the light emitted by the at least one light source; and
    a display panel configured to form an image by using the light guided by the light guide plate,
    wherein a plurality of grating patterns are formed on an exit surface of the light guide plate, each grating pattern being configured to direct the light to toward different respective viewing zones from among a plurality of viewing zones, and
    wherein an interval between adjacent grating patterns from among the plurality of grating patterns satisfies at least one condition from among a first range less than 1/10 of a wavelength of the light emitted by the light source and a second range greater than 180/π times the wavelength of the light emitted by the light source,
wherein a repetition interval of a plurality of gratings of a grating pattern from among the plurality of grating patterns is constant across the grating pattern.

11. The image display apparatus of claim 10, wherein the wavelength of the light emitted by the light source is within a range of between 380 nm and 780 nm.

12. The image display apparatus of claim 10, wherein the interval between the adjacent grating patterns satisfies at least one condition from among the first range and a third range greater than 30 μm.

13. The image display apparatus of claim 10, wherein the plurality of grating patterns comprises a plurality of panel-oriented grating patterns that form orientations toward the plurality of viewing zones and a plurality of dummy grating patterns respectively disposed between adjacent panel-oriented grating patterns from among the plurality of panel-oriented grating patterns.

14. An image display apparatus comprising:
at least one light source configured to emit light;
a light guide plate configured to guide the light emitted by the at least one light source; and
a display panel configured to form an image by using the light guided by the light guide plate,
wherein a plurality of grating patterns are formed on an exit surface of the light guide plate, each grating pattern being configured to direct the light to toward different respective viewing zones from among a plurality of viewing zones,
wherein an interval between adjacent grating patterns from among the plurality of grating patterns satisfies at least one condition from among a first range less than 1/10 of a wavelength of the light emitted by the light source and a second range greater than 180/π times the wavelength of the light emitted by the light source,
wherein the plurality of grating patterns comprises a plurality of panel-oriented grating patterns that form orientations toward the plurality of viewing zones and a plurality of dummy grating patterns respectively disposed between adjacent panel-oriented grating patterns from among the plurality of panel-oriented grating patterns, and
wherein the plurality of dummy grating patterns are configured to prevent light that propagates from each dummy grating pattern from among the plurality of dummy grating patterns from being used to form the image.

15. The image display apparatus of claim 13, wherein the plurality of dummy grating patterns are configured to direct light that propagates from each dummy grating pattern from among the plurality of dummy grating patterns outside a viewing angle of the display panel.

16. The image display apparatus of claim 13, further comprising a dummy light blocking layer comprising a plurality of light blocking regions configured to prevent light that propagates from each dummy grating pattern from among the plurality of dummy grating patterns from being incident upon the display panel.

17. The image display apparatus of claim 13, wherein the plurality of dummy grating patterns are configured such that a respective wavelength band selected in each dummy grating pattern from among the plurality of dummy grating patterns is different from a respective wavelength band of a pixel oriented by each dummy grating pattern from among the plurality of dummy grating patterns.

18. The image display apparatus of claim 13, wherein a respective average refractive index of each dummy grating pattern from among the plurality of dummy grating patterns is substantially identical to an average refractive index of at least one panel-oriented grating pattern from among the plurality of panel-oriented grating patterns that is adjacent to each dummy grating pattern from among the plurality of dummy grating patterns.

19. The image display apparatus of claim 18, wherein at least one from among a pitch of a grating and a direction of a grating of each dummy grating pattern from among the plurality of dummy grating patterns is different from at least one from among a pitch of grating and a direction of a grating of at least one panel oriented grating patter from among the plurality of panel-oriented grating patterns that is adjacent to each dummy grating pattern from among the plurality of dummy grating patterns.

20. The image display apparatus of claim 13, wherein a light emission efficiency of each dummy grating pattern from among the plurality of dummy grating patterns is lower than a light emission efficiency of each panel-oriented grating pattern from among the plurality of panel-oriented grating patterns.

21. The directional backlight unit of claim 1, wherein the interval between the adjacent grating patterns from among the plurality of grating patterns comprises a nonzero interval.

22. The image display apparatus of claim 10, wherein the interval between the adjacent grating patterns from among the plurality of grating patterns comprises a nonzero interval.

* * * * *